United States Patent
Kumar Y. B. et al.

(10) Patent No.: US 12,306,328 B2
(45) Date of Patent: May 20, 2025

(54) DYNAMIC POWER MANAGEMENT IN LOW POWER RADAR SOLUTIONS

(71) Applicant: TEXAS INSTRUMENTS INCORPORATED, Dallas, TX (US)

(72) Inventors: Chethan Kumar Y. B., Bangalore (IN); Joseph Leslie Quintal, Morgan Hill, CA (US); Akash Gondalia, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 535 days.

(21) Appl. No.: 17/331,425

(22) Filed: May 26, 2021

(65) Prior Publication Data

US 2022/0326346 A1    Oct. 13, 2022

(30) Foreign Application Priority Data

Apr. 12, 2021  (IN) .............................. 202141017056

(51) Int. Cl.
| | |
|---|---|
| *G01S 7/03* | (2006.01) |
| *G01S 7/35* | (2006.01) |
| *H02M 1/08* | (2006.01) |
| *H02M 3/158* | (2006.01) |

(52) U.S. Cl.
CPC ..................... *G01S 7/03* (2013.01); *G01S 7/35* (2013.01); *H02M 1/08* (2013.01); *H02M 3/158* (2013.01)

(58) Field of Classification Search
CPC ............ G01S 7/03; G01S 7/35; G01S 7/4013; H02M 1/0032; H02M 1/0048; H02M 1/08; H02M 3/158; H02M 3/1584
See application file for complete search history.

(56) References Cited

U.S. PATENT DOCUMENTS

| | | | | |
|---|---|---|---|---|
| 2010/0103024 | A1* | 4/2010 | Schultheiss | H01L 23/055 73/290 R |
| 2013/0088378 | A1* | 4/2013 | Kobayashi | G01S 7/03 327/181 |
| 2018/0136028 | A1* | 5/2018 | Kleman | G01S 7/35 |
| 2019/0390997 | A1* | 12/2019 | Blomberg | G01S 13/88 |
| 2020/0103516 | A1* | 4/2020 | Kim | G01S 13/88 |
| 2021/0064142 | A1* | 3/2021 | Stern | G01S 13/42 |
| 2021/0190929 | A1* | 6/2021 | Mazur | G01S 13/87 |

* cited by examiner

*Primary Examiner* — Timothy A Brainard
(74) *Attorney, Agent, or Firm* — Michael T. Gabrik; Frank D. Cimino (57) ABSTRACT

A system includes a power manager, where the power manager includes a direct current (DC) to DC converter. The DC to DC converter includes a first driver configured to provide a voltage at a first power level. The DC to DC converter also includes a second driver configured to provide the voltage at a second power level, where the second power level is lower than the first power level. The system also includes a radar sensor configured to receive the voltage. The system further includes a controller configured to instruct the power manager to switch between the first driver and the second driver based at least in part on an activity level of the radar sensor.

20 Claims, 5 Drawing Sheets

днаmic POWER MANAGEMENT IN LOW
POWER RADAR SOLUTIONS

DYNAMIC POWER MANAGEMENT IN LOW POWER RADAR SOLUTIONS

CROSS-REFERENCE TO RELATED APPLICATIONS

The present application claims priority to Indian Provisional Patent Application No. 202141017056, which was filed Apr. 12, 2021, is titled "Dynamic Power Management Scheme To Enable Low Power Radar Solutions," and is hereby incorporated herein by reference in its entirety.

BACKGROUND

Radar sensors are used in a variety of applications to detect the range, velocity, and angular position (also referred to herein as an angle) of objects. The usage and function of the radar sensor determines, in part, the amount of power consumed by the radar sensor.

SUMMARY

In accordance with at least one example of the description, a system includes a radar sensor. The system also includes a power converter configured to provide a first voltage supply and a second voltage supply to the radar sensor, where the second voltage supply consumes less power than the first voltage supply. The system also includes a controller coupled to the radar sensor and to the power converter, where the controller is configured to cause the power converter to provide the first voltage supply to the radar sensor during an active period of the radar sensor, and configured to cause the power converter to provide the second voltage supply to the radar sensor during an inactive period of the radar sensor.

In accordance with at least one example of the description, a method includes providing a first power supply to a radar sensor. The method also includes sending a chirp with the radar sensor and detecting that the chirp has completed. The method further includes, responsive to the detection, providing a second power supply to the radar sensor, where the second power supply consumes less power than the first power supply. The method also includes receiving a signal to provide the first power supply to the radar sensor. The method further includes, responsive to the signal, providing the first power supply to the radar sensor.

In accordance with at least one example of the description, a system includes a power manager, where the power manager includes a direct current (DC) to DC converter. The DC to DC converter includes a first driver configured to provide a voltage at a first power level. The DC to DC converter also includes a second driver configured to provide the voltage at a second power level, where the second power level is lower than the first power level. The system also includes a radar sensor configured to receive the voltage. The system further includes a controller configured to instruct the power manager to switch between the first driver and the second driver based at least in part on an activity level of the radar sensor.

BRIEF DESCRIPTION OF THE DRAWINGS

For a detailed description of various examples, reference will now be made to the accompanying drawings in which.

DETAILED DESCRIPTION

A radar sensing technology called mmWave transmits signals with wavelengths in the millimeter range. Conventional mmWave radar sensors have multiple power supply rails with differing specifications. Supply rails that power the radio frequency (RF) and analog portions of the radar sensor may have stringent specifications, such as ripple and noise specifications. Supply rails that power digital portions of the radar sensor or input/output (I/O) may have relaxed specifications. Overall power consumption of the radar system includes the power consumed during radar operations, as well as the power consumed when the sensor initializes. In a conventional system, the radar sensor undergoes a wakeup process, and then the initialization begins. During initialization, an application for a processor within the radar sensor is downloaded from flash memory. After the application is downloaded to the radar sensor, a boot process begins. Then, a self-calibration loop is performed. mmWave radar sensors are complementary metal-oxide-semiconductor (CMOS) devices and are sensitive to temperature, humidity, etc., which makes a self-calibration step useful. A large increase in power consumption occurs in the self-calibration step. Finally, radar data is collected and processed. Data is then transferred to a host application. The level of power consumption from these steps is too high for some low-power radar applications. Also, in conventional systems, a low, uniform supply noise is maintained for many radar system operations, even during radar operations where the low, uniform supply noise may be unnecessary. Using this low, uniform supply noise and other stringent supply specifications during all or most of the radar operations results in increased power consumption.

In examples herein, power consumption of a radar sensor is reduced by switching between higher power and lower power field effect transistors (FETS) that provide power for the radar sensor. In linear frequency modulated continuous wave (FMCW) radars, the transmit (TX) signal is a single tone with a frequency that changes linearly with time. This change in frequency is referred to as a "chirp." A set of these chirps form a "frame," and the frame may be used as the observation window for radar processing. Higher size power FETS are used during active periods of the radar sensor, such as during the time the radar sensor is transmitting a chirp. During inactive periods of the radar sensor, such as between chirps or between frames, lower size power FETS are used to reduce total power consumption. A microcontroller switches between the higher size power FETS and the lower size power FETS depending on the activity level of the radar sensor. With examples herein, power consumption may be reduced, which enables mmWave radar sensors to be employed in many lower power applications, such as applications that operate on battery power. Also, in examples herein, specifications such as ripple, switching frequency, and noise may be relaxed during non-chirping operations. A smaller power FET size may also be used during non-chirping operations. Relaxing these specifications dynamically based on the operating conditions of the radar sensor may reduce overall power consumption of the radar sensor. The specifications may be relaxed to achieve a target power consumption in one example.

Figure 1:
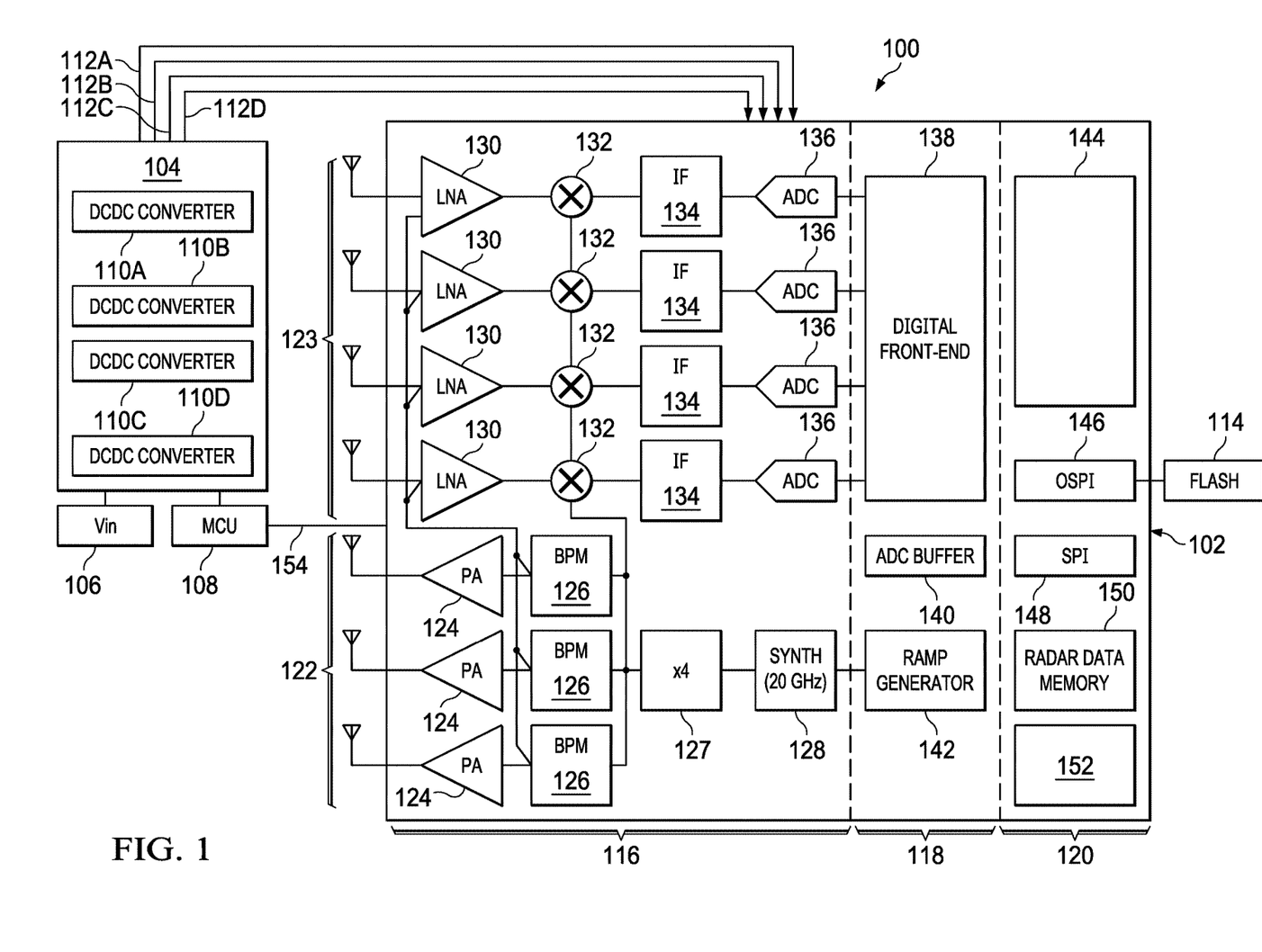
FIG. 1 is a block diagram of a system for dynamic power management in accordance with various examples.

FIG. 1 is a block diagram of a system 100 for dynamic power management in accordance with various examples herein. System 100 includes a radar sensor 102, a power management integrated circuit (PMIC) 104, a power supply 106, and a microcontroller (MCU) 108. PMIC 104 includes DC to DC converters 110A, 110B, 110C, and 110D. PMIC 104 is a power manager that provides power to radar sensor 102 via supply lines 112A, 112B, 112C, and 112B.

Flash memory 114 is coupled to radar sensor 102. Radar sensor 102 includes an RF/analog front end 116, a radio processor subsystem 118, and a processor subsystem 120. RF/analog front end 116 includes transmit antennae 122, receive antennae 123, power amplifiers (PA) 124, binary phase modulators (BPMs) 126, multiplier 127, synthesizer 128, low noise amplifiers (LNAs) 130, mixers 132, intermediate frequency (IF) amplifiers 134, and analog to digital converters (ADCs) 136. Radar sensor 102 may include any number of each of these components in other examples.

Radio processor subsystem 118 includes digital front end 138, ADC buffer 140, and ramp generator 142. Processor subsystem 120 includes processor 144, quad serial peripheral interface (QSPI) 146, serial peripheral interface (SPI) 148, radar data memory 150, and hardware accelerator 152.

Radar sensor 102 may include other components not shown in FIG. 1, such as oscillators, memory, controllers, I/O interfaces, a clock subsystem, buses, sub-processors, digital signal processing (DSP) subsystems, etc. The details of the radar operations performed by components of radar sensor 102 are omitted here for simplicity, but, in summary, radar sensor 102 transmits, receives, and processes radar signals to sense the range, angle, and/or velocity of objects. Flash memory 114 stores applications for radar sensor 102 that may be loaded to radar sensor 102 to perform various operations.

Radar sensor 102 may be used in automotive applications, home automation applications, industrial applications, and the like. In one example, radar sensor 102 is used as a level sensing device. The level of a material inside a tank is measured by radar sensor 102. A current loop coupled to a radar sensor provides variable amounts of power to the radar sensor 102 depending on the level of material in the tank, as determined by the radar sensor. If the tank is empty, the loop may provide approximately four milliamps (mA) of current. If the tank is full, the loop may provide approximately 20 mA. Therefore, the radar system used for the level sensing application should be capable of running on as little as 4 mA of average current, as this is the minimum amount of current provided by the current loop. This example indicates one use of a low power radar sensor, although many other uses are possible. Conventional systems that use 60 mJ of power are incapable of operating on 4 mA of current.

PMIC 104 includes DC to DC converters 110A, 110B, 110C, and 110D in this example. More or fewer DC to DC converters 110 may be present in other examples. DC to DC converters 110 provide power to various supply lines 112 that power the internal components of radar sensor 102. The voltage and current values provided by DC to DC converters 110 described herein are one example of voltage and current values in a system 100 for dynamic power management. Other voltage and current values may be used in other examples. DC to DC converter 110A provides approximately 3.3 volts (V) to radar sensor 102 via supply line 112A. Supply line 112A powers I/O operations in one example, and DC to DC converter 110A provides a maximum current of approximately 50 mA during operation. DC to DC converter 110B provides approximately 1.8 V to radar sensor 102 via supply line 112B. Supply line 112B powers I/O operations or certain analog components, such as synthesizer 128, IF amplifiers 134, and/or ADCs 136 in one example. DC to DC converter 110B provides a maximum current of approximately 850 mA during operation.

DC to DC converter 110C provides approximately 1.0 V to radar sensor 102 via supply line 112C. In other examples, DC to DC converter 110C provides approximately 1.3 V to radar sensor 102. Supply line 112C powers certain RF components, such as LNAs 130, PA 124, and mixers 132 in one example. DC to DC converter 110C provides a maximum current of approximately 2000 mA during operation. DC to DC converter 110D provides approximately 1.2 V to radar sensor 102 via supply line 112D. Supply line 112D powers digital components and memory in one example, such as digital front end 138 and radar data memory 150. DC to DC converter 110D provides a maximum current of approximately 1000 mA during operation.

Power supply 106 provides a voltage $V_{in}$ to PMIC 104 from an external power supply or a battery supply. PMIC 104 uses voltage $V_{in}$ to provide supply lines 112 to radar sensor 102. In one example, $V_{in}$ is approximately 5 V. Other values of $V_{in}$ may be used in other examples. In examples herein, MCU 108 is coupled to PMIC 104. As described below, in examples herein, MCU 108 instructs PMIC 104 to use a larger power FET driver and control logic during radar operations, if higher power and more stringent power supply requirements are useful. These operations may be referred to as high power operations, and this operating mode may be referred to as the high power mode. MCU 108 instructs PMIC 104 to use a smaller power FET driver and control logic if radar operations are not active, such as between frames. These operations may be referred to as low power operations, and this operating mode may be referred to as the low power mode. In some examples, MCU 108 may be able to instruct PMIC 104 to switch to the low power mode between chirps as well as between frames. If the duty cycle of the chirp waveforms is low (meaning that no chirps are being actively transmitted a large portion of the time), PMIC 104 may operate in the low power mode much more often than in the high power mode. While operating in the low power mode, power consumption is reduced compared to the high power mode.

In one example, MCU 108 includes a serial interface 154 to radar sensor 102. MCU 108 may perform programming operations for radar sensor 102, which provide operating instructions to radar sensor 102. These operating instructions include the timing of high power operations, such as transmitting chirps. Therefore, MCU 108 may synchronize the instructions for the operation of radar sensor 102 with the instructions sent to PMIC 104 to enter the high power mode or the low power mode. If MCU 108 instructs radar sensor 102 to perform a radar operation, MCU 108 also instructs PMIC 104 to enter the high power mode. If MCU 108 instructs radar sensor 102 to stop performing radar operations, MCU 108 also instructs PMIC 104 to enter the low power mode. In another example (not shown in FIG. 1), MCU 108 may be embedded in or combined with radar sensor 102. If MCU 108 is embedded in radar sensor 102, latency between MCU 108 and radar sensor 102 is reduced, which allows for faster or more frequent transitions between high power mode and low power mode.

In another example, MCU 108 may instruct PMIC 104 to dynamically switch between high power mode and low power mode based on sensing the current consumption of radar sensor 102. MCU 108 uses a sensor (not shown in FIG. 1) or another feedback mechanism to detect the level of current being consumed by radar sensor 102. If the level of current is above a predetermined threshold, MCU 108 instructs PMIC 104 to enter the high power mode. If the level of current is below the predetermined threshold, MCU 108 instructs PMIC 104 to enter the low power mode.

Figure 2:
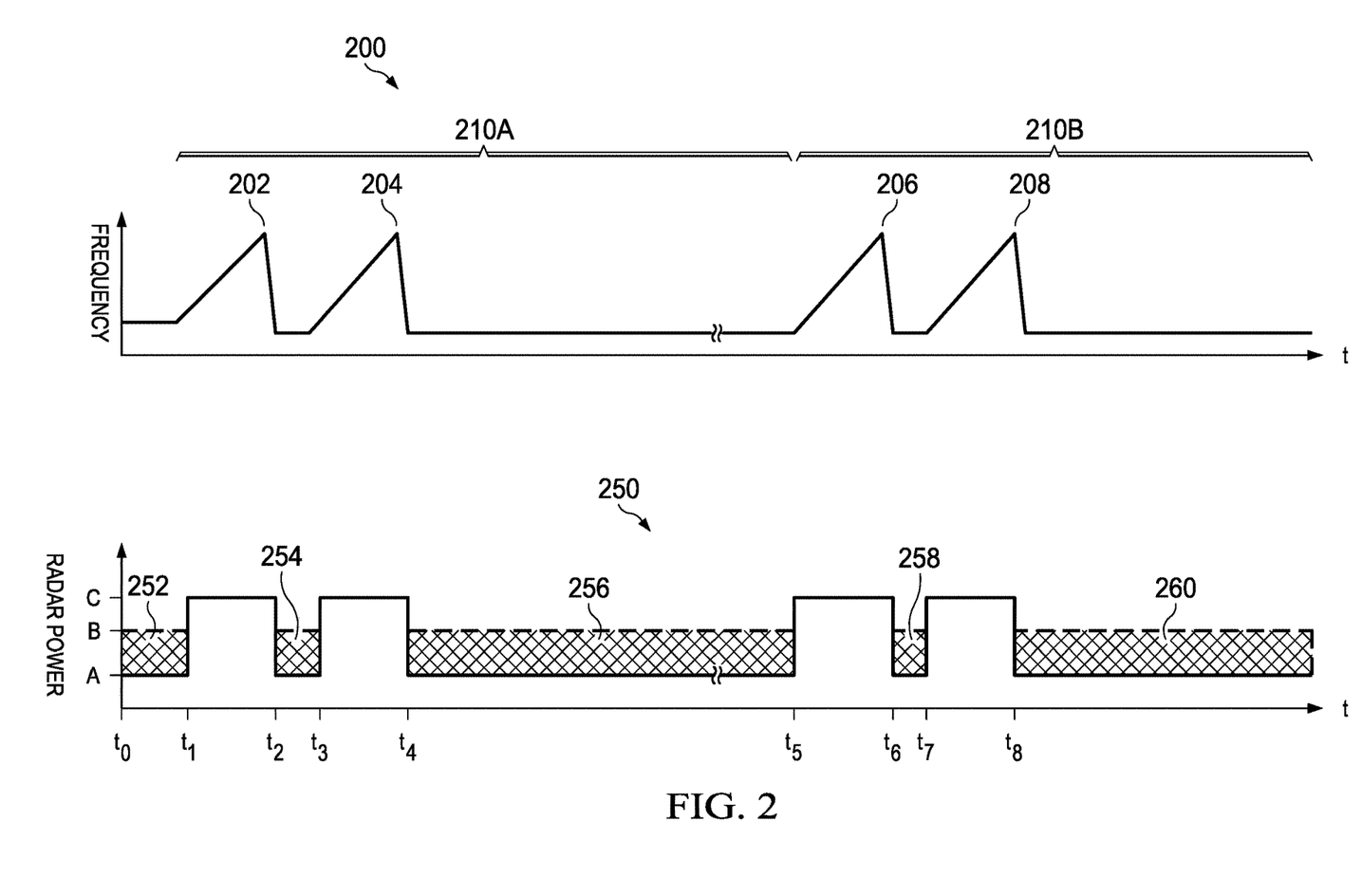
FIG. 2 is a timing diagram of frequency and radar system power consumption in accordance with various examples.

FIG. 2 shows timing diagrams of waveforms for frequency and radar system power consumption versus time in accordance with various examples. Timing diagram 200 is at the top of FIG. 2. Timing diagram 200 is an example of a low duty cycle FMCW chirp waveform. The x-axis of timing diagram 200 represents time, while the y-axis represents frequency. Chirps 202, 204, 206, and 208 are shown. Chirps are signals where the frequency increases or decreases in time. The chirps 202, 204, 206, and 208 indicate an increase in frequency. In this example, chirps 202 and 204 represent a first frame 210A. Chirps 206 and 208 represent a second frame 201B. Because this is a low duty cycle FMCW chirp waveform, there is a relatively long idle period in frame 210A before frame 210B begins, during which no chirps are being transmitted. In examples herein, PMIC 104 may switch to the low power mode during these idle periods between chirps, such as between chirp 204 and 206. In some examples, PMIC 104 may switch to the low power mode during idle periods between chirps within the same frame as well, such as between chirps 202 and 204.

Timing diagram 250 is at the bottom of FIG. 2. Timing diagram 250 is an example of power consumption during a low duty cycle FMCW chirp waveform. The x-axis of timing diagram 250 represents time, while the y-axis represents radar power. The x-axis of timing diagram 250 is aligned with the x-axis of timing diagram 200. Timing diagram 250 shows periods where high radar power is useful, as well as periods where lower radar power may be used. During the periods of lower radar power, PMIC 104 may enter a low power mode as described herein to reduce power consumption.

As shown in timing diagram 250, if PMIC 104 is operating in the high power mode at time $t_0$, the radar power level is at level B on the y-axis. At time $t_1$, chirp 202 begins. During chirp 202, power consumption is increased. Therefore, timing diagram 250 show that the radar power level is at level C during chirp 202 (between time $t_1$ and $t_2$). At time $t_2$, chirp 202 ends. During a period of high radar power, such as radar power reaching level C, high power mode is used to provide adequate power for the operations and to meet power supply requirements.

Between times $t_2$ and $t_3$, no chirp is being transmitted. Therefore, the radar power level is at level B during this time interval. At time $t_3$, chirp 204 begins. During chirp 204, radar power level increases to level C. at time $t_4$, chirp 204 ends. Because the example in FIG. 2 is a low duty cycle FMCW chirp waveform, a large idle period exists between chirp 204 and frame 210B. This idle period is between $t_4$ and $t_5$. If PMIC 104 is operating in high power mode during this idle period, the radar power level is at level B.

At time $t_5$, frame 210B begins. Chirp 206 begins at time $t_5$, and continues until time $t_6$. Radar power level is at level C between times $t_5$ and $t_6$. Between times $t_6$ and $t_7$, radar power level is at level B if PMIC 104 is operating in high power mode. At time $t_7$, chirp 208 begins. Chirp 208 ends at time $t_8$. Radar power level is at level C between times $t_7$ and $t_8$. After time $t_8$, radar power level is at level B if PMIC 104 is operating in high power mode, and continues at that level until the next frame begins (not shown in FIG. 2).

In examples herein, power consumption may be reduced if PMIC 104 enters the low power mode during the times between chirps and/or between frames. For example, between times to and $t_1$, PMIC 104 is operating in high power mode, and the radar power level is at level B. However, if PMIC 104 were operating in low power mode between times $t_0$ and $t_1$, radar power level could be reduced to level A. The crosshatch area 252 indicates extra power that is dissipated by operating PMIC 104 in the high power mode between times $t_0$ and $t_1$. Likewise, crosshatch areas 254, 256, 258, and 260 indicate extra power that is dissipated by operating PMIC 104 in the high power mode during these respective time intervals. If PMIC 104 operates in the lower power mode during these time intervals, radar power level may be reduced to level A during these time intervals. Because timing diagram 200 represents a low duty cycle FMCW chirp waveform, there are relatively long time intervals where radar operations are idle or mostly idle. PMIC 104 may be operating in the low power mode (with radar power level A), instead of the high power mode (with radar power level B), during these idle periods.

In some examples, the largest savings in power consumption occur by instructing PMIC 104 to enter low power mode between active periods of frames, such as between chirps 204 and 206. As the duty cycle of the FMCW chirp waveforms drops, the idle periods between chirps becomes larger. Additional power savings may be achieved by instructing PMIC 104 to enter low power mode between chirps that are close to one another, such as between chirps 202 and 204. If the latencies between MCU 108, radar sensor 102, and PMIC 104 are small enough, MCU 108 may instruct PMIC 104 to enter low power mode between these chirps 202 and 204. If the latencies are too large, or the intervals between chirps 202 and 204 is too small, there may not be enough time to instruct PMIC 104 to switch modes between the chirps 202 and 204 in some examples.

Figure 3:
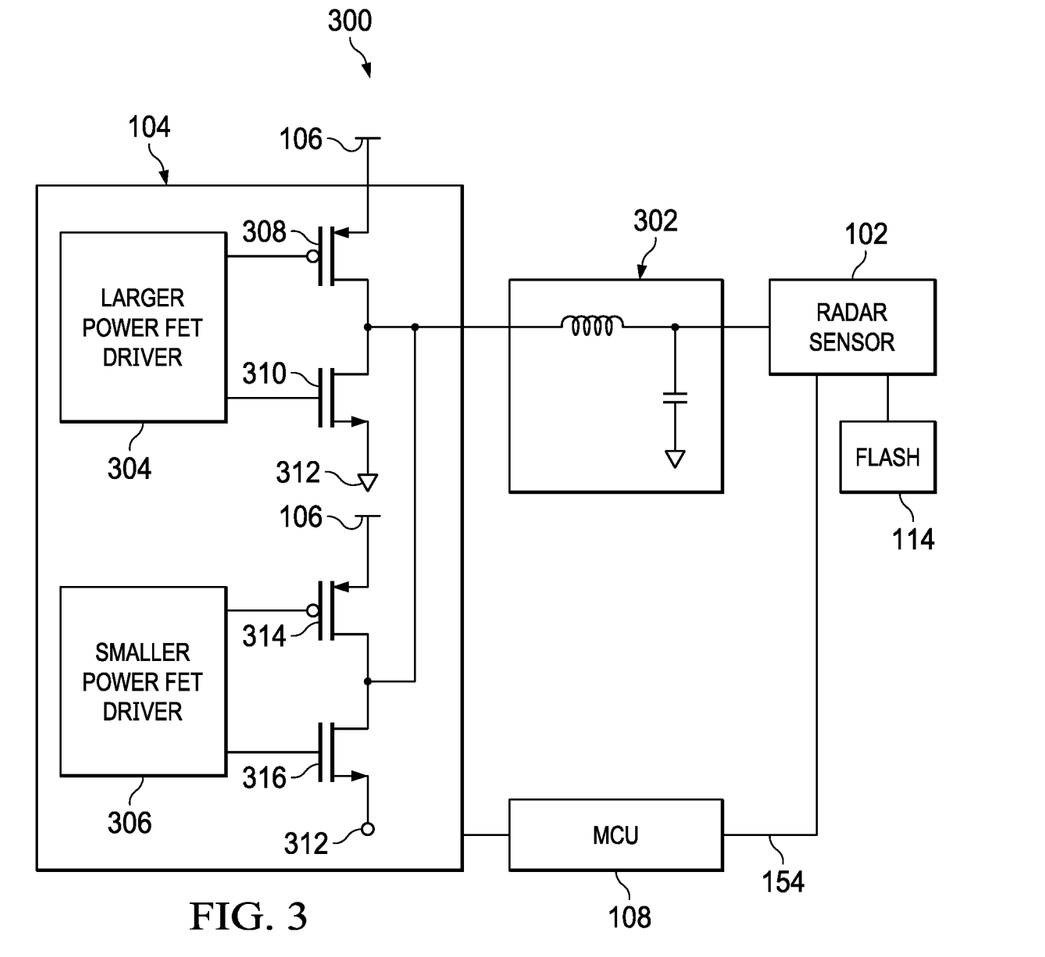
FIG. 3 is a circuit schematic diagram of a system for dynamic power management in accordance with various examples.

FIG. 3 is a circuit schematic diagram of a system 300 for dynamic power management in accordance with various examples. System 300 includes radar sensor 102, PMIC 104, power supply 106, MCU 108, flash memory 114, and serial interface 154. System 300 also includes LC filter 302 that reduces power supply ripple for PMIC 104. System 300 includes larger power FET driver 304 and smaller power FET driver 306. Larger power FET driver 304 is coupled to FETS 308 and 310, with FET 310 coupled to a ground voltage potential 312. Smaller power FET driver 306 is coupled to FETS 314 and 316. The components shown in PMIC 104 in FIG. 3 may comprise components of a DC to DC converter 110 as described in FIG. 1. If PMIC 104 includes multiple DC to DC converters 110, the components shown in PMIC 104 in FIG. 3 may be replicated multiple times.

In this example, PMIC 104 may receive a signal from MCU 108 and switch between a higher power mode (represented by larger power FET driver 304) that provides a first voltage supply and a lower power mode (represented by smaller power FET driver 306) that provides a second voltage supply. Referring back to FIG. 1, during the low power mode, one or more of DC to DC converters 110 may be driven by a smaller power FET driver 306 instead of a larger power FET driver 304. Only one smaller power FET driver 306 and one larger power FET driver 304 are shown in FIG. 3, although more may be present in other examples. As an example, DC to DC converter 110B provides approximately 1.8 V to radar sensor 102 via supply line 112B. As described above, supply line 112B powers I/O operations or certain analog components, such as synthesizer 128, IF amplifiers 134, and/or ADCs 136 in one example. During periods where radar operations are idle (such as between chirps and/or between frames), DC to DC converter 110B may be placed into a low power mode represented by smaller power FET driver 306. Many of the components powered by supply line 112B are not active or are less active while radar operations are idle, such as IF amplifiers 134 and ADCs 136. Therefore, low power mode using smaller power FET driver 306 provides sufficient power during these idle periods.

As another example, DC to DC converter 110C provides approximately 1.0 V or 1.3 V to radar sensor 102 via supply line 112C. As described above, supply line 112C powers certain RF components, such as LNA 130s, PA 124, and mixers 132 in one example. These components may not be active or may be less active during periods where radar operations are idle. During these periods (such as between chirps and/or between frames), DC to DC converter 110C may be placed into a low power mode represented by smaller power FET driver 306. Likewise, low power modes and high power modes may be useful for any of the DC to DC converters 110 in PMIC 104.

Larger power FET driver 304 and smaller power FET driver 306 may each include any circuitry or control logic to control the FETS coupled to the respective FET drivers. In an example, FETS 308 and 310 may be larger size FETS than FETS 314 and 316. Also, FETS 308 and 310 may operate at a higher switching frequency than FETS 314 or 316. The switching frequency is useful for charging and discharging the gate capacitances of the FETS. In one example, larger size FETS are switched at a frequency of approximately 4 MHz during the high power mode, while smaller size FETS are switched at a frequency of approximately 100 kHz during the low power mode. In other examples, the larger size FETS may be switched at any other frequency, and the lower size FETS may also be switched at any other frequency. Larger size FETS have higher gate capacitances and higher power dissipation due to the higher switching frequency in some examples. At higher load currents, larger size FETS will have lower $I^2R$ (conduction) loss and lesser ripple due to the higher switching frequency, which makes the larger size FETS suitable during the active region of chirping. Active regions often have more stringent power supply requirements, such as lower ripple.

In contrast, smaller size power FETS have lower gate capacitances and smaller power dissipation at lower load currents, in part due to lower switching frequencies. Therefore, smaller size power FETS are useful for non-active regions (such as non-chirping regions). A higher ripple caused by smaller size power FETS may be tolerable during the non-chirping regions.

As described above, MCU 108 instructs PMIC 104 to use the larger power FET driver 304 during chirp operations, as higher power and more stringent power supply requirements are useful during these operations. MCU 108 instructs PMIC 104 to use the smaller power FET driver 306 if radar operations are not active, such as between frames. MCU 108 may also instruct PMIC 104 to reduce switching frequency during the low power mode. MCU 108 may instruct PMIC 104 to switch to the low power mode for any combination of the DC to DC converters 110 in PMIC 104. MCU 108 also sends instructions to radar sensor 102 via serial interface 154 in some examples. Therefore, MCU 108 may time the instructions to PMIC 104 so that the low power mode coincides with the non-active regions of radar sensor 102. If chirp actions are performed, MCU 108 instructs PMIC 104 to enter the high power mode.

Figure 4:
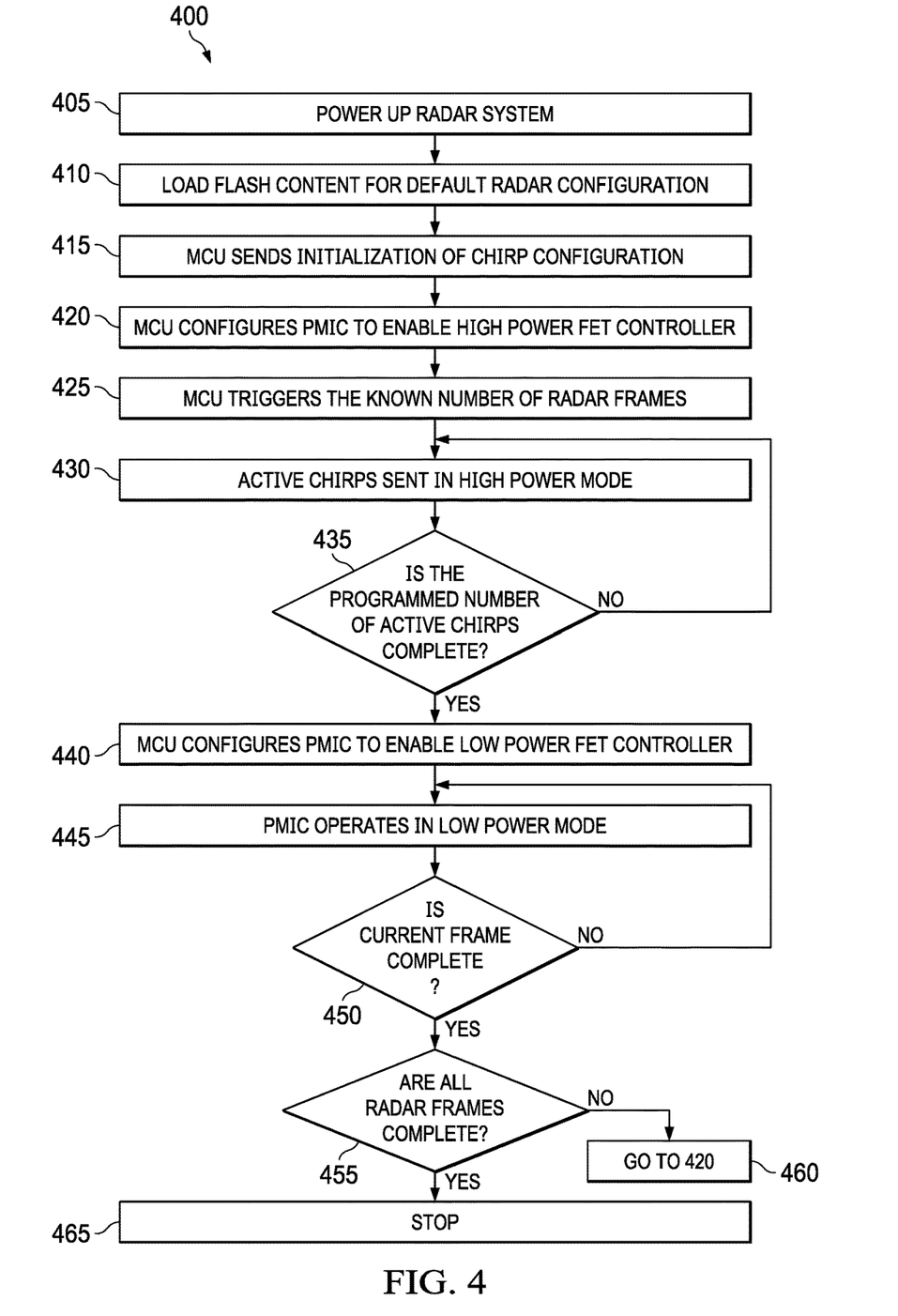
FIG. 4 is a flow diagram of a method for dynamic power management in accordance with various examples.

FIG. 4 is a flow diagram of a method 400 for dynamic power management in accordance with various examples herein. The steps of method 400 may be performed in any suitable order. The hardware components described above with respect to FIGS. 1 and 3 may perform method 400 in one example. In the example below, radar sensor 102, PMIC 104, MCU 108, and other components are described as performing certain steps of method 400. In other examples, different components may perform some or all of the steps described below.

Method 400 begins at 405, where the radar system powers up. As described above, a radar sensor 102 may initialize during a power up process. The method 400 proceeds to 410, where flash content is loaded to a radar sensor 102 for a default radar configuration. Flash content may be loaded from a flash memory such as flash memory 114, which loads applications and other content to radar sensor 102.

Method 400 proceeds to 415, where MCU 108 sends an initialization of chip configuration to PMIC 104. Method 400 then proceeds to 420, where the MCU 108 configures PMIC 104 to enable a higher power FET controller. This step places PMIC 104 in the high power mode, and enables larger power FET driver 304 to begin operation in one example.

Method 400 proceeds to 425, where MCU 108 triggers the known number of radar frames. Here, MCU 108 indicates to radar sensor 102 how many radar frames to transmit. Radar sensor 102 will transmit chirps and frames until the known number of radar frames is met.

Method 400 proceeds to 430, where active chirps are sent in high power mode. Active chirps are shown in timing diagram 200 described above. Method 400 proceeds to 435, where MCU 108 and/or radar sensor 102 determines whether the programmed number of active chirps are complete. If the programmed number of active chirps are not complete, method 400 returns to 430 to send another active chirp in high power mode. If the programmed number of active chirps are complete, method 400 moves to 440. MCU 108 may determine whether the programmed number of active chirps are complete by monitoring radar sensor 102 in one example. In another example, radar sensor 102 notifies MCU 108 after the programmed number of active chirps are complete.

At 440, MCU 108 configures PMIC 104 to enable a lower power FET controller. This step places PMIC 104 in the low power mode, and enables smaller power FET driver 306 to begin operation in one example. Method 400 proceeds to 445, where PMIC 104 operates in the low power mode. During this time, power consumption is reduced compared to operating in the high power mode.

At 450, MCU 108 determines if the current frame is complete. A frame includes one or more chirps, and MCU 108 determines if all of the chirps in the current frame have been completed, plus any idle time that occurs after the chirps but before the next frame begins. If the current frame is not complete, the method returns to 445, where PMIC 104 operates in the low power mode until the frame is complete. If the current frame is complete, method 400 moves to 455.

At 455, MCU 108 determines if all radar frames are complete. Multiple radar frames may be transmitted in various examples. If all radar frames are not complete, method 400 proceeds to 460, where the method returns to 420 to configure PMIC 104 to again operate in the high power mode. If all radar frames are complete in 455, method 400 proceeds to 465, where method 400 stops.

Figure 5:
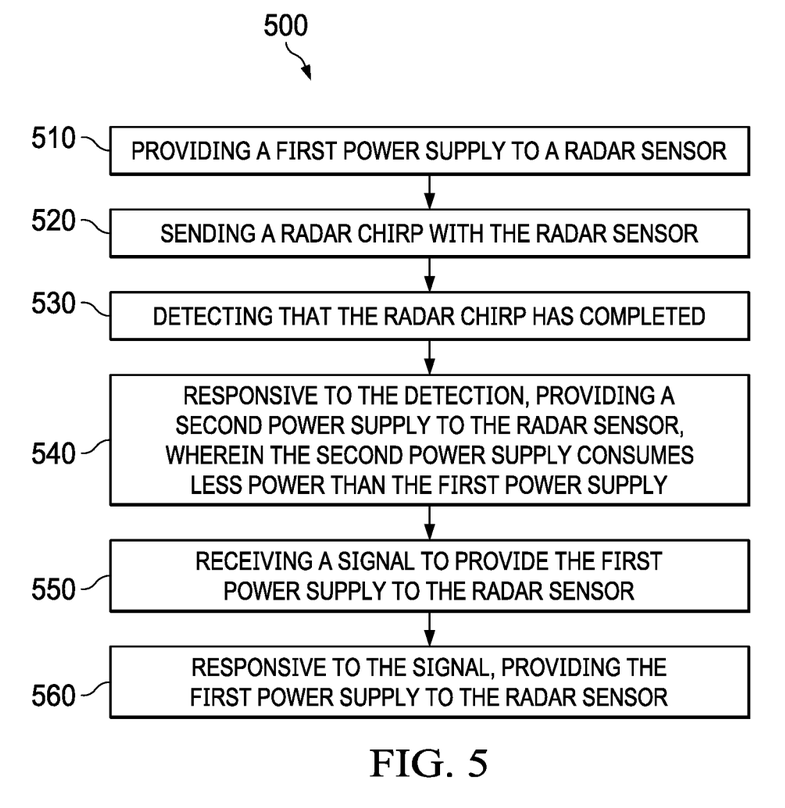
FIG. 5 is a flow diagram of a method for dynamic power management in accordance with various examples.

FIG. 5 is a flow diagram of a method 500 for dynamic power management in accordance with various examples herein. The steps of method 500 may be performed in any suitable order. The hardware components described above with respect to FIGS. 1 and 3 may perform method 500 in one example. In the example below, radar sensor 102, PMIC 104, MCU 108, and other components are described as performing certain steps of method 500. In other examples, different components may perform some or all of the steps described below.

Method 500 begins at 510, where a power management chip provides a first power supply to a radar sensor. The power management chip may be a chip such as PMIC 104, which provides a first power supply to radar sensor 102 with a DC to DC converter 110. In one example, the first power supply is provided by a FET driver such as larger power FET driver 304.

Method 500 continues at 520, where the radar sensor sends a chirp. Radar sensor 102 may send a chirp. Examples of chirps are shown in timing diagram 200 of FIG. 2.

Method 500 continues at 530, where a controller detects that the chirp has completed. The controller may be a microcontroller such as MCU 108. In one example, MCU 108 monitors a current from radar sensor 102, and determines that a chirp has completed by detecting that a current has dropped below a predetermined threshold. In another example, MCU 108 instructs radar sensor 102 on radar operations such as sending chirps, which means that MCU 108 knows the time at which radar sensor 102 has completed the chirp. Because MCU 108 knows the operations of radar sensor 102 in this example, MCU 108 may control other devices such as PMIC 104 in synchronization with the actions of radar sensor 102.

Method 500 continues at 540 where, responsive to the detection, the power management chip provides a second power supply to the radar sensor, where the second power supply consumes less power than the first power supply. In an example, PMIC 104, which provides the second power supply to radar sensor 102 with a DC to DC converter 110. The second power supply is provided by a FET driver such as smaller power FET driver 306.

Method 500 continues at 550, where the power management chip receives a signal to provide the first power supply to the radar sensor. In an example, MCU 108 sends the signal to PMIC 104 to provide the first power supply to radar sensor 102. The first power supply provides more power than the second power supply, and so it is used for active radar operations, such as transmitting a chirp.

Method 500 continues at step 560 where, responsive to the signal, the power management chip provides the first power supply to the radar sensor. In one example, with the first power supply supplying a higher power level to radar sensor 102, radar sensor 102 may complete active radar operations, such as sensing the range, velocity, or angle of an object.

In some examples, a self-calibration loop is performed. As described above, mmWave radar sensors are CMOS devices and are sensitive to temperature, humidity, etc., which makes a self-calibration step useful. A large increase in power consumption occurs during the self-calibration step. To save additional power, results from a previous calibration may be stored in memory. During the self-calibration, the results from the previous calibration may be used if the operating conditions (temperature, humidity, etc.) have not changed beyond an acceptable threshold. If the operation conditions have changed beyond the acceptable threshold, the calibration may be performed again.

As described above, dynamic power management may reduce the total power consumed by a radar sensor. The radar sensor may then be used for low power applications. In one example, power consumption may be reduced from 60 mJ to under 20 mJ. Power consumption of less than 20 mJ allows mmWave radar sensors to be used for application such as home automation (lighting, presence detection, etc.), wireless sensor nodes, and battery-powered applications. In other examples, the conventional power consumption may be more or less than 60 mJ, and the reduced power consumption using dynamic power management may be a value other than 20 mJ.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. For example, a resistor or capacitor shown and described herein as a single component may instead be multiple resistors or capacitor, respectively, coupled in parallel between the same nodes. For example, a resistor or capacitor shown and described herein as a single component may instead be multiple resistors or capacitor, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A system, comprising:
a radar sensor including transmit circuitry;
a power management circuit including a first direct current (DC) to DC converter coupled to the transmit circuitry of the radar sensor via a first supply line, the first DC to DC converter configured to provide to the radar sensor a first power level during an active time period of the radar sensor when the transmit circuitry is transmitting a chirp and provide a second power level during an inactive time period of the radar sensor when no chirp is being transmitted by the transmit circuitry for at least a threshold amount of time, wherein the second power level is lower than the first power level;
a controller coupled to the radar sensor and to the power management circuit, wherein the controller is configured to monitor an electrical characteristic of the radar sensor, and based thereon, control the power management circuit to provide the first and second power levels during the active and inactive time periods, respectively; and
and a digital component;
wherein the power management circuit further includes a second DC to DC converter coupled to the radar sensor via a second supply line, the second DC to DC converter configured to provide variable power levels to the digital component.

2. The system of claim 1, wherein the active time period includes a period during which the first power level is provided to the transmit circuitry.

3. The system of claim 1, wherein the power management circuit includes a first driver and a first switching circuit coupled to the first driver to provide the first power level, and a second driver and a second switching circuit coupled to the second driver to provide the second power level.

4. The system of claim 3, wherein the first switching circuit includes a first pair of field effect transistors (FETs), and the second switching circuit includes a second pair of FETs, in which each FET of the first pair of FETs has a larger gate capacitance than each FET of the second pair of FETs.

5. The system of claim 1, wherein the controller is configured to cause the power management circuit to operate at a first frequency during the active time period and operate at a second frequency during the inactive time period, wherein the first frequency is higher than the second frequency.

6. The system of claim 1, wherein the controller is configured to place the radar sensor into the active time period.

7. The system of claim 1, wherein the electrical characteristic monitored by the controller includes a current in the radar sensor, the controller configured to provide the first power level when it is determined by the controller that the current is above a threshold, and to provide the second power level when it is determined by the controller that the current is below the threshold.

8. The system of claim 1, wherein a first voltage ripple associated with providing the first power level is lower than a second voltage ripple associated with providing the second power level.

9. The system of claim 1, further comprising a filter having an input and an output, the input of the filter coupled to an output of the power management circuit and the output of the filter coupled to an input of the radar sensor.

10. The system of claim 1, further comprising multiple digital components including the digital component, wherein the second DC to DC converter is configured to provide variable power levels to the multiple digital components.

11. A method, comprising:
providing, by a first driver and a first switching circuit, a first power level to a radar sensor;
sending a chirp with the radar sensor;
detecting, by a controller, that the chirp has ended;
responsive to the detecting, providing, by a second driver and a second switching circuit, a second power level to the radar sensor during a time from when the chirp has ended until a next chirp is to be sent, wherein the second power level is lower than the first power level;
receiving a signal, by the controller, to provide the first power level to the radar sensor when the next chirp is to be sent; and
responsive to the signal, providing, by the first driver and the first switching circuit, the first power level to the radar sensor when the next chirp is sent.

12. The method of claim 11, wherein the first driver and the first switching circuit provide the first power level, and the second driver and the second switching circuit provide the second power level, and wherein the first power level is higher than the second power level.

13. The method of claim 12, wherein the second switching circuit operates at a lower frequency than the first switching circuit.

14. The method of claim 11, further comprising detecting that the chirp has ended by detecting a current in the radar sensor.

15. The method of claim 11, further comprising:
sending a frame of chirps including the chirp and the next chirp, including providing the first power level during the sending of each chirp of the frame of chirps and providing the second power level between the sending of adjacent chirps.

16. The method of claim 11, further comprising:
sending, prior to providing the first power level to the radar sensor, a signal to initialize the radar sensor including sending information pertaining to a configuration of a frame of chirps to be sent, the frame of chirps including the chirp and the next chirp.

17. A system, comprising:
a power management circuit, including a direct current (DC) to DC converter, the DC to DC converter including:
a first switching circuit;
a second switching circuit;
a first driver configured to drive the first switching circuit; and
a second driver configured to drive the second switching circuit;
a radar sensor coupled to the power management circuit, the radar sensor including transmit circuitry configured to transmit radar chirps; and
a controller configured to instruct the power management circuit to switch between the first driver and the second driver based at least in part on whether the transmit circuitry is transmitting a radar chirp.

18. The system of claim 17, wherein the radar sensor is configured to receive a higher power level during transmission of a chirp by the transmit circuitry than during an idle time of the transmit circuitry when no chirp is transmitted.

19. The system of claim 17, wherein the first driver is configured to operate at a first frequency and the second driver is configured to operate at a second frequency, the first frequency being higher than the second frequency.

20. The system of claim 17, wherein the controller is configured to detect whether or not the transmit circuitry is transmitting a chirp by monitoring a current in the radar sensor.

\* \* \* \* \*